United States Patent
Kalenborn (10) Patent No.: US 9,803,564 B2
(45) Date of Patent: Oct. 31, 2017

(54) DUAL-FUEL FUEL INJECTOR

(71) Applicant: L'ORANGE GMBH, Stuttgart (DE)

(72) Inventor: Markus Kalenborn, Kornstadt (DE)

(73) Assignee: L'ORANGE GMBH, Stuttgart (DE)

( * ) Notice: Subject to any disclaimer, the term of this patent is extended or adjusted under 35 U.S.C. 154(b) by 10 days.

(21) Appl. No.: 15/108,743

(22) PCT Filed: Dec. 10, 2014

(86) PCT No.: PCT/EP2014/003303
§ 371 (c)(1),
(2) Date: Jun. 28, 2016

(87) PCT Pub. No.: WO2015/101406
PCT Pub. Date: Jul. 9, 2015

(65) Prior Publication Data
US 2016/0319754 A1    Nov. 3, 2016

(30) Foreign Application Priority Data

Dec. 30, 2013  (DE) ......................... 10 2013 022 260

(51) Int. Cl.
*F02M 61/16*   (2006.01)
*F02D 19/06*   (2006.01)
(Continued)

(52) U.S. Cl.
CPC ......... *F02D 19/0694* (2013.01); *F02D 19/10* (2013.01); *F02M 21/0263* (2013.01);
(Continued)

(58) Field of Classification Search
CPC .... F02D 19/0694; F02D 19/10; F02D 41/402; F02D 41/0025; F02M 43/04;
(Continued)

(56) References Cited

U.S. PATENT DOCUMENTS 4,499,862 A * 2/1985 Baumer ................ F02M 43/04
                                                                    123/1 A
4,700,672 A * 10/1987 Baguena ............ F02D 19/0684
                                                                    123/299

(Continued)

FOREIGN PATENT DOCUMENTS

DE     3540780 A1    5/1987
DE     3501236 C1    11/1989
(Continued)

*Primary Examiner* — Hai Huynh
(74) *Attorney, Agent, or Firm* — Lucas & Mercanti, LLP; Klaus P. Stoffel (57) ABSTRACT

A dual-fuel fuel injector, having: a first nozzle needle for discharge of liquid fuel via a first nozzle arrangement; and a multiplicity of second nozzle needles, arranged around the first nozzle needle and controlled in terms of axial stroke, for discharge of gaseous fuel via a second nozzle arrangement. Each of the second nozzle needles has for controlling the stroke thereof, a respective control chamber in the injector which can be charged with and relieved of pressure by a control fluid. The dual-fuel fuel injector has an annular duct which can be charged with and relieved of pressure by the control fluid. The dual-fuel fuel injector is designed such that, for controlling the stroke of the second nozzle needles, the control chambers for the second nozzle needles are charged with and relieved of pressure by the control fluid proceeding from the annular duct.

12 Claims, 4 Drawing Sheets

(51) Int. Cl.
*F02M 43/04* (2006.01)
*F02M 47/04* (2006.01)
*F02M 21/02* (2006.01)
*F02D 19/10* (2006.01)

(52) U.S. Cl.
CPC .......... *F02M 43/04* (2013.01); *F02M 47/046* (2013.01); *Y02T 10/32* (2013.01); *Y02T 10/36* (2013.01)

(58) Field of Classification Search
CPC ............. F02M 21/0263; F02M 47/046; F02M 61/045; F02M 61/18; F02M 61/1806; F02M 61/1886; F02M 61/1893; Y02T 10/32; Y02T 10/36

USPC ............ 123/27 GE, 299, 300, 525, 431, 575

See application file for complete search history.

(56) References Cited

U.S. PATENT DOCUMENTS

| | | | |
|---|---|---|---|
| 6,422,199 B1* | 7/2002 | Buckley | F02M 45/086 123/299 |
| 7,556,017 B2* | 7/2009 | Gibson | F02M 47/027 123/299 |
| 8,459,576 B2* | 6/2013 | Kim | F02D 19/0647 123/299 |
| 8,909,457 B2* | 12/2014 | Puckett | F02M 21/0281 123/27 GE |
| 9,303,610 B2* | 4/2016 | Jay | F02M 43/04 |
| 9,376,992 B2* | 6/2016 | Brown | F02M 43/04 |
| 9,518,518 B2* | 12/2016 | Coldren | F02D 41/0025 |
| 2014/0069387 A1* | 3/2014 | Brown | F02M 45/086 123/456 |

FOREIGN PATENT DOCUMENTS

| | | |
|---|---|---|
| DE | 102012010614 A1 | 12/2013 |
| EP | 0575887 A1 | 12/1993 |
| EP | 0778410 A1 | 6/1997 |
| EP | 1274933 B1 | 10/2004 |

\* cited by examiner

DUAL-FUEL FUEL INJECTOR

The present application is a 371 of International application PCT/EP2014/003303, filed Dec. 10, 2014, which claims priority of DE 10 2013 022 260.5, filed Dec. 30, 2013, the priority of these applications is hereby claimed and these applications are incorporated herein by reference.

BACKGROUND OF THE INVENTION

The present invention concerns a dual-fuel fuel injector.

Publication DE 35 01 236 C1 discloses a cylinder cover for a piston internal combustion engine, wherein the cylinder cover has an injection nozzle in the center and at least two peripheral injection nozzles.

Gaseous fuels are gaining importance in the large engine sector, in particular in stationary engines for power generation. Because of its very good availability and more favorable emission potential compared with diesel fuel, natural gas is ideal for economic and environmentally-friendly engine operation. Most gas engines work on the spark-ignition combustion process, i.e. with homogeneous combustion and external ignition, wherein the ignition can be initiated either by a spark plug or by a diesel pilot injector. The spark-ignition combustion process has however the disadvantage that during the charge cycle, due to the external mixture formation, an undesirable methane loop occurs. Methane loops can however only be prevented if a combustion process with internal mixture formation is applied in the engine. For this, a direct high-pressure injection is required.

Dual-fuel nozzles, in particular those in which the gas valve and fuel needles are accommodated in the same nozzle body, are very complex to produce. The needles are e.g. arranged nested concentrically in each other in the nozzle body, see for example publication EP 1 274 933 B1, or housed separately in the nozzle body, e.g. the fuel needle is positioned centrally and further gas needles are arranged eccentrically in the nozzle body in order to cover the full combustion chamber range of 360°.

Irrespective of the variant concerned, the installation space in the nozzle body is always extremely constricted and hence disadvantageous for production of the nozzle in view of the necessary cost of production. This applies in particular if the gas shut-off elements (gas needles) must sit close to the combustion chamber at the nozzle holes, since otherwise a substantial proportion of gas continues to flow in or out after combustion and can adversely affect the hydrocarbon emissions.

SUMMARY OF THE INVENTION

On this basis, it is an object of the present invention to propose an improved dual-fuel fuel injector which remedies the problem of construction space while being in particular advantageously simple to produce.

According to the invention, a dual-fuel fuel injector is proposed, in particular for use with a first liquid fuel such as diesel fuel, heavy oil, bio-oil, and a second gaseous fuel or combustion gas such as e.g. natural gas, methane, bio-gas. The dual-fuel fuel injector is provided for a fuel injection device of an internal combustion engine, in particular e.g. for a gas common rail system. In general, the fuel injector is preferably used with an internal combustion engine in the form of a gas engine, in particular based on a spark-ignition or diesel engine (with internal mixture formation), furthermore in particular with a large engine and furthermore in particular also for stationary applications, e.g. for engine-based cogeneration systems or industrial applications.

By means of the proposed dual-fuel fuel injector, both a purely liquid fuel mode and a combined liquid/gas mode can be implemented with any ratio of gas to liquid, in particular in the pilot injection method (with high-pressure gas injection).

The dual-fuel fuel injector proposed according to the invention has a first nozzle needle, the axial stroke of which can be controlled, for the delivery of liquid fuel via a first nozzle arrangement of the dual-fuel fuel injector. The dual-fuel fuel injector is here preferably configured for indirect (hydraulic) control of the first nozzle needle; alternatively however direct control of the first nozzle needle may also be provided. The first nozzle needle is preferably accommodated in a nozzle body of the fuel injector.

The dual-fuel fuel injector furthermore has a plurality of second nozzle needles, the axial stroke of which can be controlled and which are arranged around the first nozzle needle for the delivery of a gaseous fuel via a second nozzle arrangement of the dual-fuel fuel injector, for example two, three, four, five or more second nozzle needles. In particular, an arrangement is provided with a central first nozzle needle and second nozzle needles arranged eccentrically thereto, preferably concentrically to the first nozzle needle. Like the first nozzle needles, preferably the second nozzle needles are also accommodated in the nozzle body. As part of the second nozzle arrangement, each second nozzle needle is assigned e.g. one or more gas injection nozzle openings (spray holes) on the injector, which can be freely opened via said second nozzle needles.

According to the invention, furthermore for each of the second nozzle needles, for controlling their stroke (indirectly), a (separate) control chamber is provided on the dual-fuel fuel injector for pressurization—charging and relief—with a control fluid (pressurized or highly pressurized), preferably in the form of liquid fuel. In particular, it is provided that the control chambers of the second nozzle needles are also formed in the nozzle body.

The dual-fuel fuel injector according to the invention furthermore—characteristically—has a ring channel which can be charged and relieved via the control fluid, or pressurized with the control fluid, in particular selectively. Here the dual-fuel fuel injector is configured to charge and relieve—selectively—the control chambers for the second nozzle needles via the control fluid, for controlling the stroke of the second nozzle needles, starting from or via the ring channel (i.e. corresponding to the control fluid pressure level in the ring channel). The control chambers for the second nozzle needles are here in particular each connected communicatively to the ring channel.

The proposed dual-fuel fuel injector allows production with structurally significantly reduced complexity for the control of the second nozzle needles, wherein the installation space situation is also more comfortable than with conventional dual-fuel injectors. For example, as well as the gas needles, the pilot valve (without actuator) for the control system may also now be accommodated in the nozzle body. Furthermore, the dual-fuel fuel injector according to the invention allows a control pressure level to be set in the control chambers of the second nozzle needles, in particular indirectly and further preferably uniformly, in an advantageously simple fashion, via the ring channel or its control fluid pressure level (i.e. the ring channel acts as a pre-control chamber for the plurality of control chambers of the second nozzle needles).

In order to pressurize the second nozzle needles with an intended control pressure level for their stroke control, the dual-fuel fuel injector is in particular configured to be able to set a predefined control fluid pressure level in the ring channel, i.e. depending on the current operating or injection situation. For this, the ring channel preferably has at least one control fluid inlet and at least one control fluid outlet; furthermore—again, in a manner saving construction space and simple to produce—a small number of flow paths may be sufficient to set the pressure level in the ring channel.

Preferred embodiments provide the capacity to selectively relieve the pressure in the ring channel for the pressure level setting, in particular by being able to selectively open the control fluid outlet for this, i.e. to the low-pressure side of the fuel injector. For this, the dual-fuel fuel injector preferably has a pilot valve, in particular a 2/2-way directional control valve or 3/2-way valve. Alternatively or additionally, it may be provided that the control fluid inlet to the ring channel can be opened selectively in a similar manner (starting from a high-pressure side on the injector). A choke device is preferably arranged in each inlet and/or outlet.

Further advantages in relation to the improvement of the constricted construction space situation on the nozzle body, and the intended arrangement of the second nozzle needles or gas needles and pilot valve close to the nozzle, arise from refinements of the invention which provide that the dual-fuel fuel injector has a further control chamber for controlling the stroke of the first nozzle needle (liquid-fuel nozzle needle), and the control chambers for the second nozzle needles are formed on the injector closer to the nozzles than the control chamber for the first nozzle needle.

In such an arrangement in which the control chamber for the first nozzle needle is arranged in particular in a plane further away from the nozzle, and the control chambers for the second nozzle needles are arranged in a second plane closer to the nozzle, i.e. with an axial offset to the control chamber for the first nozzle needle, a gas unit including second nozzle needles, second control chambers and pilot valve may be provided and mounted close to the nozzle, advantageously utilizing the construction space well, as proposed for example in a ring sleeve housing (which surrounds a guide portion of the nozzle body for the first nozzle needle), in particular as a compact unit (similar to a drum carousel for the second nozzle needles). Also, such a refinement of the dual-fuel fuel injector allows the use of shorter second nozzle needles than in the prior art, with advantageously smaller moving mass. In such a solution, the ring channel may in particular be arranged (viewed in the axial direction) between the control chambers for the second nozzle needles and the control chamber for the first liquid-fuel nozzle needle.

Particularly robust embodiments of the dual-fuel fuel injector, which are advantageously simple to produce and save construction space, arise in the invention with embodiments in which the dual-fuel fuel injector has a multi-piece, in particular a three-piece nozzle body housing. Here the ring channel may simply be formed between a first (separately made) and a second (separately made) housing part, e.g. by means of at least one ring groove. Furthermore, the second nozzle needles may be accommodated in a third (separately made) housing part, preferably—as outlined above—in the form of a ring sleeve, and the control chambers thereof for the second nozzle needles may communicate with the ring channel via the second housing part, e.g. a simple-to-produce intermediate plate with bores.

The multi-piece nozzle body thus provided may be braced externally and/or internally to create an inseparable unit.

Preferably, and again advantageously extremely simply to produce, the dual-fuel fuel injector has a second ring channel (for combustion gas) to which each nozzle chamber of the second nozzle needles is connected communicatively for its supply with gaseous fuel. In particular in a solution which provides a third housing part as a ring sleeve, the second ring channel can easily be worked into the housing of the nozzle body or the third housing part, in particular again as a ring groove, starting from a central opening of the ring sleeve.

The invention also proposes a fuel injection device with at least one dual-fuel fuel injector as explained above.

Further features and advantages of the invention arise from the description below of exemplary embodiments of the invention, with reference to the drawings which show details essential to the invention, and the claims. The individual features may be implemented individually or as a plurality in any combination in a variant of the invention.

Preferred embodiments of the invention are explained in more detail below with reference to the attached drawings. These show.

BRIEF DESCRIPTION OF THE DRAWING

DETAILED DESCRIPTION OF THE INVENTION

In the description which follows and in the drawings, the same reference numerals designate elements with the same or comparable function.

Figure 1:
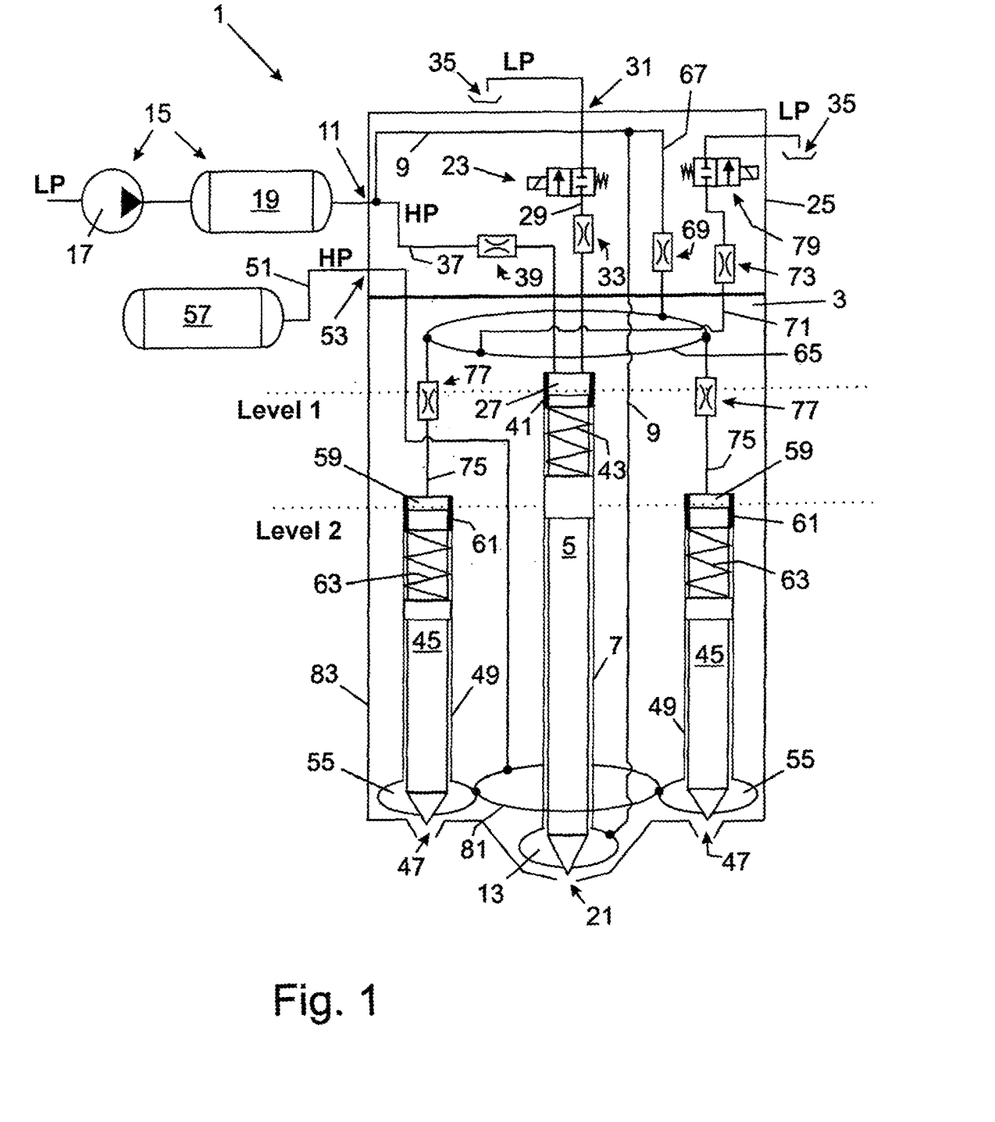
FIG. 1 as an example and diagrammatically, in particularly greatly simplified, a dual-fuel fuel injector connected to gas and liquid fuel supply devices, according to a possible embodiment of the invention.

FIG. 1 shows as an example a dual-fuel fuel injector (dual-fuel nozzle) 1 according to the invention, for a dual-fuel fuel injection system, in particular a gas common rail system, or for an internal combustion engine (not shown), in particular a gas/diesel engine. The dual-fuel fuel injector 1 is provided for an injection operation both with a first liquid fuel (in particular diesel fuel, bio-oil or heavy oil) and a second gaseous fuel (combustion gas) and has a nozzle body (nozzle element) 3.

The nozzle body 3 houses a first nozzle needle 5, the axial stroke of which can be controlled, i.e. in an axial bore 7 of the nozzle body 3. The first nozzle needle 5 is provided for injection processes with liquid fuel. For operation with liquid fuel, the dual-fuel fuel injector 1 furthermore has a high-pressure line 9 which leads from a liquid-fuel inlet 11 on the dual-fuel fuel injector 1 to a liquid-fuel nozzle chamber 13 in the nozzle body 3.

To supply the fuel injector 1 with liquid fuel, as part of a fuel injection device, a high-pressure (HP) supply device 15 may be provided, for example formed by means of a high-pressure pump 17 and a rail 19 and/or individual pressure accumulators, via which high-pressure supply device 15 liquid fuel taken from a tank can be delivered to the liquid-fuel inlet 11.

The dual-fuel fuel injector 1 is furthermore configured to deliver high-pressure liquid fuel into the nozzle chamber 13 via a first nozzle arrangement 21 of the dual-fuel fuel injector 1 as a function of the (stroke) setting of the nozzle needle 5, in particular into a combustion chamber of an internal combustion engine in an injection mode (e.g. purely liquid-fuel mode or pilot injection mode).

The dual-fuel fuel injector 1 is—as shown—configured, for injecting the liquid fuel, preferably as an indirectly operated injector 1, in particular with a pilot valve (control valve) 23 which is preferably controlled by a magnetic actuator (or e.g. a piezo actuator). Alternatively, it may be provided to configure the dual-fuel fuel injector 1, for the injection of liquid fuel, as a directly actuated injector 1, wherein the actuator acts in particular directly on the nozzle needle 5.

Via the pilot valve 23, preferably accommodated with its actuator in an injector housing 25, a control chamber 27 of the fuel injector 1 for the first nozzle needle 5 may be pressure-relieved depending on the valve position, in particular via a leakage flow path 29 of the fuel system internal to the injector. The leakage flow branch 29 leads from the control chamber 27 to a low-pressure side (LP) leakage outlet 31 of the injector 1, i.e. via the pilot valve 23 (below choke 33), e.g. to a leakage collection container 35 (tank).

Furthermore, a high-pressure path 37 of the fuel system internal to the injector (with choke 39) opens into the control chamber 27 for the first nozzle needle 5, via which path the control chamber 27 can be charged with high-pressure liquid fuel starting from the high-pressure line (high-pressure channel) 9. The control chamber 27 may be defined by means of a needle guide sleeve 41 which is received in the axial bore 7 at its end remote from the nozzle, wherein a closing spring 43 may also be arranged in the axial bore 7 which presses the nozzle needle 5 into the closed position, i.e. against a valve seat or nozzle needle seat next to the nozzle arrangement 21.

In order to deliver liquid fuel via the first nozzle arrangement 21 for liquid-fuel injection mode, i.e. from the nozzle chamber 13, the (closing) force equilibrium at the nozzle needle 5 may be eliminated by relieving the pressure in the control chamber 27 via the pilot valve 23 (leakage flow path 29 opened), so that the nozzle needle 5 lifts away from the valve seat and can open the flow path to the spray holes of the nozzle arrangement 21. To close the nozzle valve, the pilot valve 23 is switched to the blocking position (see FIG. 1), whereupon the pressure in the control chamber 27 builds up again via the high-pressure path 9, 37 and the nozzle needle 5 returns to the needle seat supported by the closing spring force.

Thus evidently liquid fuel serves as the control fluid for charging and relieving the control chamber 27.

As illustrated in FIG. 1, the dual-fuel fuel injector 1 furthermore has a plurality of second nozzle needles 45, the axial stroke of which can be controlled and which are arranged around the first nozzle needle 5, for the delivery of gaseous fuel via a second nozzle arrangement 47 of the dual-fuel fuel injector 1 (gas (nozzle) needles). The second nozzle needles 45 arranged around the first nozzle needle 5, e.g. four second nozzle needles 45, are—like the first nozzle needle 5—each accommodated in an axial bore 49 of the nozzle body 3, in particular in a concentric arrangement around the first nozzle needle 5, so that an advantageously good 360° coverage can be achieved in the combustion chamber in gas injection processes.

For operation with gaseous fuel e.g. natural gas, bio-gas etc., the dual-fuel fuel injector 1 furthermore has a high-pressure gas line 51 which leads from a combustion gas inlet 53 on the dual-fuel fuel injector 1 to a respective gas nozzle chamber 55 of the second nozzle needles 45. A flow path from the respective gas nozzle chamber 55 to at least one gas spray hole of the second gas nozzle arrangement 47 can here be shut off selectively via the respective second nozzle needle 45.

To supply the fuel injector 1 with gaseous fuel (at the nozzle chambers 55)—again, as part of a fuel injection device—a high-pressure gas supply device 57 may be provided, for example formed by means of a combustion gas store (tank) and a compressor or a liquid gas supply with high-pressure pump and evaporator, furthermore e.g. a rail etc., via which high-pressure supply device 57 the gaseous fuel e.g. natural gas can be supplied to the combustion gas inlet 53.

For gas mode, the dual-fuel fuel injector 1 is configured similarly to the active principle outlined above for the first nozzle needle 5 or liquid-fuel mode, for indirect control of the second nozzle needles 45. Highly pressurized combustion gas delivered to the gas nozzle chamber 55 can be emitted, depending on the (stroke) setting of the second nozzle needle 45, via the second nozzle arrangement 47 of the dual-fuel fuel injector 1, in particular injected into the combustion chamber of an internal combustion engine for an injection operation (e.g. pilot injection mode). With regard to the nozzle arrangement 47, one or more spray holes which can be selectively opened may be assigned to each second nozzle needle 45.

As part of the present invention, as also illustrated in FIG. 1, for each of the second nozzle needles 45, for their stroke control, a separate control chamber 59 is provided on the injector 1 for pressurization with a control fluid. As before, liquid fuel supplied via the liquid fuel inlet 11 to the dual-fuel fuel injector 1 serves as a control fluid for the indirect control of the second nozzle needles 45. A respective control chamber 59 for a second nozzle needle 45 may be defined preferably, like the control chamber 27 for the first nozzle needle 5, by means of a needle guide sleeve 61 which is accommodated in the axial bore 49 at its end remote from the nozzle, wherein furthermore a closing spring 63 may be arranged in the axial bore 49 which presses the second nozzle needle 45 into the closed position, i.e. against a valve seat or nozzle needle seat at the nozzle arrangement 47.

According to the invention, the dual-fuel fuel injector 1 furthermore has a ring channel 65 which can be charged and relieved via the control fluid (liquid fuel).

For charging, the ring channel 65 is connected to the high-pressure liquid-fuel line 9 via a control fluid inlet 67, wherein in particular an inlet choke device 69 is also arranged in the inlet branch 67. For pressure relief, the ring channel 65 can be connected via a control fluid outlet 71 selectively to the low pressure side (LP) of the fuel injector 1, i.e. towards the leakage side. The outlet branch 71 is here conducted in particular via an outlet choke device 73.

According to the invention, the dual-fuel fuel injector 1 is furthermore configured to charge and relieve or pressurize the control chambers 59 for the second nozzle needles 45, for controlling the stroke of the second nozzle needles 45, with the control fluid (via the control fluid) via or starting from the ring channel 65. For this, as shown in FIG. 1, the control chambers 59—in particular all control chambers 59—for the second nozzle needles 45 are each connected communicatively to the ring channel 65. The communicative connection of a respective control chamber 59 for a second nozzle needle 45 to the ring channel 65 advantageously requires with the invention only one (single) branch channel 75 to be provided in each case. The communication connection is here conducted in particular via a choke device 77.

During the pressurization of the ring channel 65 with control fluid, wherein in particular a predefined control fluid pressure level is set in the ring channel 65, also the communicatively connected control chambers 59 (of the second nozzle needles 45) are pressurized with control fluid, and thus necessarily a control pressure level is set in each of these, i.e. indirectly via the ring channel 65. To this extent, the ring channel 65 constitutes or forms a (common) pre-control chamber for the control chambers 59 of the second nozzle needles 45.

As part of the present invention, the dual-fuel fuel injector 1 is here preferably configured in particular to control the strokes of the second nozzle needles 45 via the ring channel 65 and the connected control chambers 59 largely simultaneously and with the same stroke profile over time. This is firstly achieved by using as far as possible the same parts on the gas injector unit formed with the second nozzle needles 45, but is made more difficult by the ever-present tolerances. Because of the tolerances (of the choke devices, the needle sleeve play (leakage through ring gap), the nozzle needle spring tension, the line or control chamber dead volume etc.), the equilibrium pressure (at which each second nozzle needle 45 begins to open) may be different over the second control chambers 59, so that the second nozzle needles 42 open with a time offset.

As part of the invention, it has however been found that the tolerances become negligible if secondly—as proposed—the sum of the cross-sections of the individual choke devices 77 is selected very much smaller than the cross-sections of the outlet choke device 73 and inlet choke device 69. Because of the small choke cross-sections 77, a very slow opening of the second nozzle needles 45 occurs, which however has a positive effect on the deflaming of the combustion gas jet in the upstream pilot injection flame (like in a blowlamp which is switched first preferably to a low level and only later turned up).

Insofar as the injection dynamic of the liquid fuel mode is furthermore not necessary for gas mode (since in gas mode, only the relatively long main injection is used), then—as evident from the overall view—the slightly temporally offset opening times are advantageously not necessary (furthermore, in addition the system only switches to gas mode above a specific part load level, so that even a minimal quantity capacity need not be taken into account).

In order to be able to close the second nozzle needles 45 more quickly (than the duration of the opening process) at the end of injection, in particular simultaneously, preferably the arrangement of at least one trigger plate may be provided in a respective control chamber 59 for a second nozzle needle 45, e.g. according to publication DE 10 2012 010 614 A1.

As in liquid fuel mode, preferably a further pilot valve (control valve) 79, in particular a single pilot valve 79, is provided on the injector 1 to relieve the pressure in the ring channel 65. The pilot valve 79 (and its actuator) is also accommodated in the injector housing 25, wherein the pilot valve 79—due to the improved combustion space situation with the invention—can advantageously also be provided in the nozzle body 3 (without actuator). The resulting advantage is that short second nozzle needles 45 with small moving masses may be used, giving an improved response behavior with less complexity. Depending on the valve setting of the pilot valve 79, the pressure in the ring channel 65 may be relieved via the control fluid outlet 71 conducted via the pilot valve 79, i.e. to the low-pressure side (LP) leakage outlet, e.g. to a leakage collection container (tank) 35. The pilot valve 79 is preferably a 2/2-way directional control valve or e.g. a 3/2-way valve.

In order to be able to deliver combustion gas for combustion gas injection mode via the second nozzle arrangement 47, i.e. from the gas nozzle chambers 55, the (closing) force equilibrium at a respective second nozzle needle 45 may be eliminated by relieving the pressure in the ring channel 65 and hence in the control chamber 59, communicatively connected thereto, for the second nozzle needle 45 via the pilot valve 79 (outlet 71 opened), so that the respective second nozzle needle 45 lifts away from a valve seat and can open the flow path to the nozzle needle arrangement 47. To close the nozzle valve, the pilot valve 79 is switched to the blocking position (see FIG. 1), whereupon the pressure in the ring channel 65 and hence in the communicatively connected control chamber 59 for the second nozzle needle 45 builds up again via the high-pressure path 9, 67, and the respective second nozzle needle 45 returns to the needle seat supported by the closing spring force.

As FIG. 1 shows, the dual-fuel fuel injector 1 is furthermore preferably advantageously designed structurally simply in that the gas nozzle chambers 55 are also connected communicatively to a (further) ring channel 81 in the dual-fuel fuel injector 1, wherein the gas nozzle chambers 55 are supplied with all the combustion gas to be delivered from the combustion gas supply line 51 via the further ring channel 81.

With reference to FIGS. 2 to 7, a preferred embodiment of the dual-fuel fuel injector is now explained in more detail.

Figure 2:
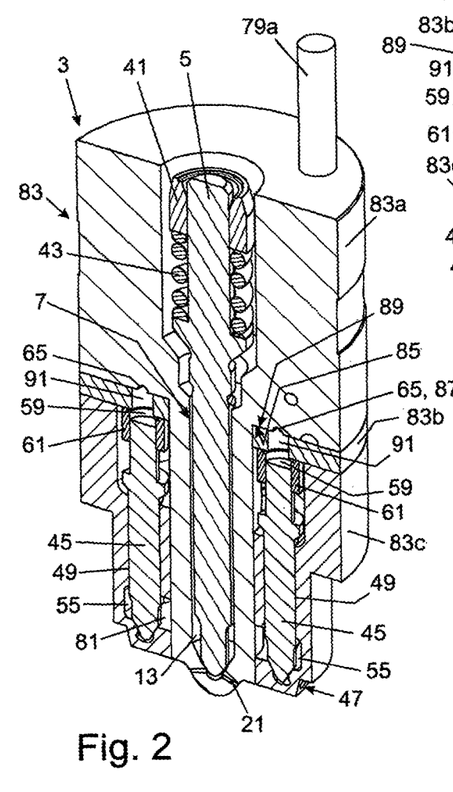
FIG. 2 as an example and diagrammatically, a section view of the nozzle body (with further components) of a dual-fuel fuel injector according to a preferred embodiment of the invention.

FIG. 2 shows the nozzle body 3 of the dual-fuel fuel injector 1 (with components accommodated therein, e.g. an actuator 79*a* of the second pilot valve 79) in a section view. The nozzle body 3 has a multi-piece housing 83, wherein a first 83*a* of three housing parts receives the liquid-fuel nozzle needle 5 and its needle guide sleeve 41 and its nozzle spring 43. At the end of the first housing part 83*a* close to the nozzle, the first nozzle arrangement 21 is formed for delivering liquid fuel, i.e. by several spray holes. At the end of the first housing part 83*a* remote from the nozzle, the control chamber 27 for the first nozzle needle 5 can be provided by the needle guide sleeve 41, i.e. in a first plane remote from the nozzle, see also FIG. 1 (plane 1).

The first housing part 83*a* of the nozzle body 3 has a portion of tapering cross-section (constant outer cross-section), forming a step (surface) 85, which extends from a longitudinal center region of the first housing part 83*a* to the nozzle arrangement 21. A ring groove 87 is worked in the step surface 85 as an advantageously simple means of providing the ring channel 65.

Figure 3:
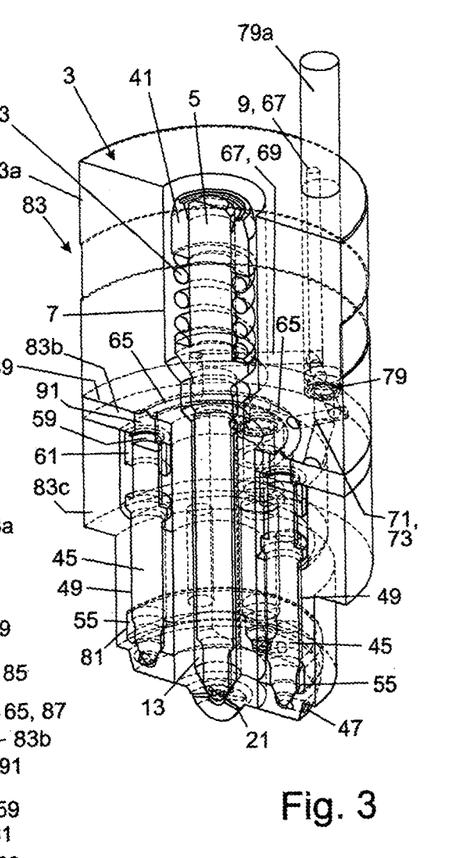
FIG. 3 as an example and diagrammatically, a transparent section view of the nozzle body according to FIG. 2.

FIG. 3, which corresponds to the view of FIG. 2 in transparent depiction, illustrates the ring groove 87 at the step surface 85 with the control fluid inlet 67 branching into it and the control fluid outlet 71 branching off it, wherein the inlet 67 and outlet 71 are each formed by means of a choke bore 69 and 73. Also with reference to the production of the flow connections 69, 73 to the ring channel 65, the design with step surface 85 evidently allows advantageously good access from this.

Figure 4:
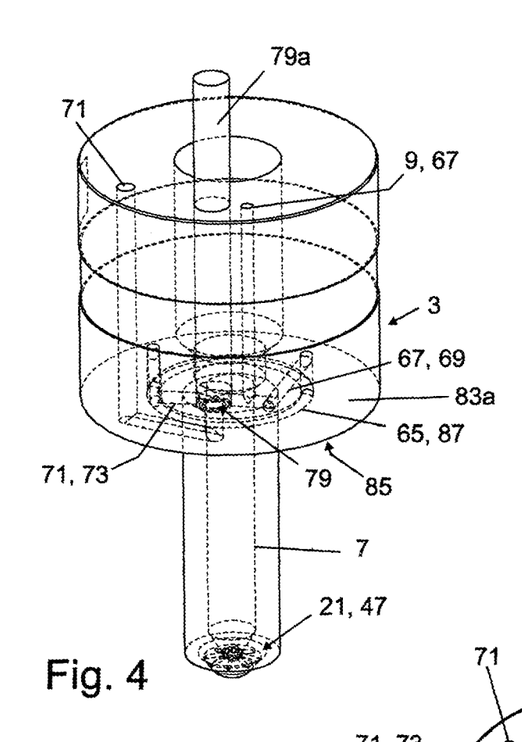
FIG. 4 as an example and diagrammatically, a transparent view of the first housing part of the nozzle body according to FIG. 2 and FIG. 3.
Figure 5:
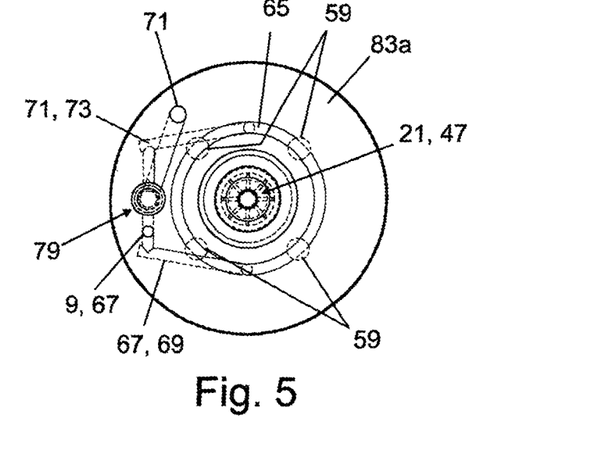
FIG. 5 as an example and diagrammatically, a transparent top view of the first housing part according to FIG. 4.

FIG. 4 and FIG. 5 illustrate the first housing part 83*a* with in particular the flow paths formed therein, each in a transparent view in more detail.

With reference now again to FIG. 2 and FIG. 3, the nozzle body housing 83 has a second housing part 83*b*. The second housing part 83*b* is provided as an intermediate plate and surrounds the tapered portion as a ring, resting against the step surface 85. The second housing part 83*b* furthermore has passages (bores) 91 which serve for the communicative connection of the control chambers 59 of the second nozzle needles 45 to the ring channel 65. The passages 91 may each form a choke device 77; alternatively or additionally, the ring channel 65 may provide the choke device 77.

In the multi-piece nozzle body housing 83 illustrated, a third housing part 83*c* is pressed against the second housing part 83*b* and receives the second nozzle needles 45 and their needle guide sleeves 61 and their nozzle springs 63 (not shown).

Figure 6:
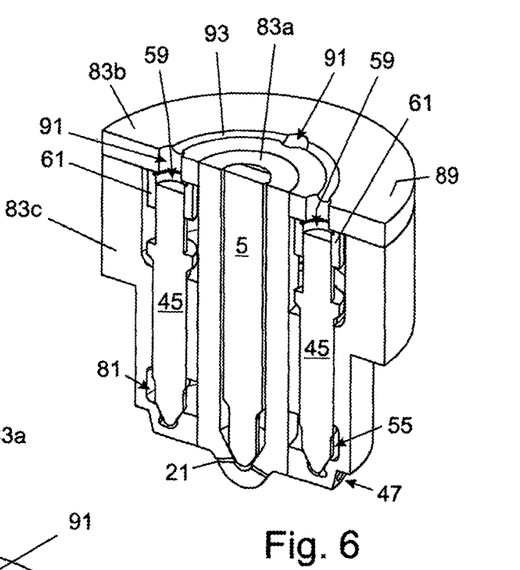
FIG. 6 as an example and diagrammatically, a section view of the second and third housing parts of the nozzle body according to FIGS. 2 and 3.
Figure 7:
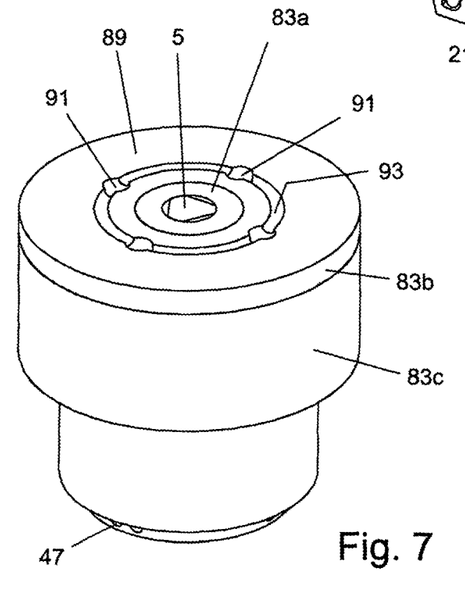
FIG. 7 as an example and diagrammatically, a further view of the second and third housing parts according to FIG. 6.

FIG. 6 and FIG. 7 illustrate this arrangement—like FIG. 2 and FIG. 3—in more detail, in particular also the passages (communication connections) 91 of the control chambers 59 for the second nozzle needles 45 with the ring channel 65 at the second housing part 83*b*.

As FIG. 6 and FIG. 7 furthermore show, also at the end face 89 of the second housing part 83*b* resting against the step surface 85, a ring groove 93 complementary to the ring groove 87 on the step surface 85 may be worked into the intermediate plate 83*b*, and the ring channel 65 may be formed by this groove and the ring groove 87 of the step surface 85. Alternatively, only a single ring groove 87 may be provided for forming the ring channel 65, i.e. in the housing part 83*a* or 83*b*. Preferably, the ring channel 65 is generally formed—as shown—between two housing parts (83*a*, 83*b*).

The third housing part 83*c* is provided as a ring sleeve (like a drum magazine accommodating the second nozzle needles 45) and is arranged on the nozzle body 3, also around the tapered portion of the first housing part 83*a*, here resting with an end face remote from the nozzle against the second housing part 83*b*.

Resting against the second housing part 83*b*, the passages 91 in the second housing part 83*b* allow the communication of the control chambers 59 with the ring channel 65, wherein the control chambers 59—formed by means of the needle guide sleeves 61 and the second housing part 83*b*—of the second nozzle needles 45 are located correspondingly at the end of the third housing part 83*c* remote from the nozzle, i.e. in a second plane closer to the nozzle than the first plane, see also FIG. 1 (plane 2). At the end of the third housing part 83*c* close to the nozzle, the second nozzle arrangement 47 is formed for the delivery of the combustion gas i.e. by means of several spray holes.

In this embodiment of the dual-fuel fuel injector 1, the ring channel 65 is thus provided between the first plane (of the first control chamber 27) and the second plane (of the second control chambers 59).

The dual-fuel fuel injector 1, see for example FIG. 2 or FIG. 6, also has a second ring channel 81, to which nozzle chambers 55 (ring chambers at the gas nozzle needle tips) of the second nozzle needles 45 are each connected communicatively for their supply with gaseous fuel. Structurally advantageously simply, the second ring channel 81 is worked into the housing 83 of the nozzle body 3 or the third housing part 83*c*, starting from the central opening of the third housing part (ring sleeve) 83*c*, in a simple manner, in particular again as a ring groove. The connection to the high-pressure line 51 can advantageously take place via a single branch channel.

The invention claimed is:

1. A dual-fuel fuel injector, comprising:
   a first nozzle arrangement;
   a first nozzle needle having a controllable axial stroke, for delivery of liquid fuel via the first nozzle arrangement;
   a second nozzle arrangement;
   a plurality of second nozzle needles each having a controllable axial stroke and arranged around the first nozzle needle for delivery of gaseous fuel via the second nozzle arrangement;
   a respective control chamber provided for each of the second nozzle needles for controlling the axial stroke, each control chamber being chargeable and relievable via a control fluid; and
   a ring channel that is chargeable and relievable via the control fluid, wherein the dual-fuel fuel injector is configured to charge and relieve the control chambers for the second nozzle needles via the control fluid, for controlling the stroke of the second nozzle needles, starting from the ring channel.

2. The dual-fuel fuel injector according to claim 1, wherein
   the dual-fuel fuel injector is configured to set a predefined control fluid pressure level in the ring channel for controlling the stroke of the second nozzle needles.

3. The dual-fuel fuel injector according to claim 1, wherein
   the ring channel has a control fluid inlet and a control fluid outlet; and
   the control fluid inlet and/or the control fluid outlet are selectively openable; wherein the control chambers for the second nozzle needles are each connected communicatively to the ring channel.

4. The dual-fuel fuel injector according to claim 1, wherein
   the ring channel has a control fluid inlet and a control fluid outlet, in each of which a choke device is arranged;
   the control chambers for the second nozzle needles are each connected communicatively to the ring channel via a further choke device; and
   a sum of choke cross-sections of the further choke devices, via which the control chambers for the second nozzle needles are connected to the ring channel, is smaller than cross-sections of the choke devices in the control fluid inlet and/or control fluid outlet of the ring channel.

5. The dual-fuel fuel injector according to claim 1, wherein
   the dual-fuel fuel injector is configured to control the stroke of the second nozzle needles via the ring channel and the control chambers connected thereto simultaneously and/or with a common stroke profile over time.

6. The dual-fuel fuel injector according to claim 1, further comprising
   a further control chamber for controlling the stroke of the first nozzle needle; wherein the control chambers for the second nozzle needles are formed on the injector closer to the nozzles than the further control chamber for the first nozzle needle.

7. The dual-fuel fuel injector according to claim 6, wherein,
   viewed in an axial direction, the ring channel is arranged between the control chambers for the second nozzle needles and the further control chamber for the first nozzle needle.

8. The dual-fuel fuel injector according to claim 1, further comprising a multi-piece nozzle body housing; the ring channel being formed between a first part and a second part of the housing; and
   the second nozzle needles being accommodated in a third part of the housing, wherein the control chambers for the second nozzle needles communicate with the ring channel via the second housing part.

9. The dual-fuel fuel injector according to claim 8, wherein the nozzle body housing is a three-piece nozzle body housing.

10. The dual-fuel fuel injector according to claim 1, further comprising a second ring channel to which each nozzle chamber of the second nozzle needles is connected communicatively so that the gaseous fuel is supplied to the nozzle chambers of the second nozzle needles via the second ring channel.

11. The dual-fuel fuel injector according to claim 1, wherein
    the dual-fuel fuel injector is configured to control the first and the second nozzle needles by pressurization with a common control fluid.

12. A fuel injection device, comprising at least one dual-fuel fuel injector according to claim 1.

\* \* \* \* \*